US012769636B2

(12) United States Patent
Shirodkar et al.

(10) Patent No.: US 12,769,636 B2
(45) Date of Patent: Oct. 20, 2026

(54) METHOD AND SYSTEM FOR PROVIDING APPLICATION HOSTING BENCHMARKS

(71) Applicant: JPMorgan Chase Bank, N.A., New York, NY (US)

(72) Inventors: Ketan Gopal Shirodkar, Thane (IN); Jeevan Reddy Surakanty, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 1218 days.

(21) Appl. No.: 17/651,992

(22) Filed: Feb. 22, 2022

(65) Prior Publication Data

US 2022/0269576 A1 Aug. 25, 2022

Related U.S. Application Data

(60) Provisional application No. 63/171,295, filed on Apr. 6, 2021.

(30) Foreign Application Priority Data

Feb. 23, 2021 (IN) ............................ 202111007629

(51) Int. Cl.
*G06F 11/34* (2006.01)
*G06Q 10/0637* (2023.01)

(52) U.S. Cl.
CPC ...... *G06F 11/3457* (2013.01); *G06F 11/3442* (2013.01); *G06Q 10/06375* (2013.01)

(58) Field of Classification Search
CPC ............ G06F 11/3457; G06F 11/3442; G06Q 10/06375
See application file for complete search history.

(56) References Cited

U.S. PATENT DOCUMENTS

2006/0161884 A1* 7/2006 Lubrecht ............ G06F 11/3442 717/104
2014/0289245 A1* 9/2014 Deshpande ......... G06F 3/04847 707/737

(Continued)

FOREIGN PATENT DOCUMENTS

WO WO-2016007824 A1 * 1/2016 .......... G06F 11/3409

*Primary Examiner* — Rehana Perveen
*Assistant Examiner* — Angel Calle
(74) *Attorney, Agent, or Firm* — GREENBLUM & BERNSTEIN, P.L.C.

(57) ABSTRACT

A method for providing predictive cost and performance analytics to facilitate benchmarking of an application host is disclosed. The method includes receiving, via a graphical user interface, an input, the input including a request to benchmark a networked environment to host an application; retrieving, from a repository based on the input, a data storage object that corresponds to the application, the data storage object including a deployment artifact and a performance script; simulating, based on the retrieved data storage object, deployment of the application in the networked environment; collecting, from the networked environment, a result of the simulation, the result including a metric that corresponds to the application; and determining, by using a model, predicted implementation information that corresponds to the application based on the result.

20 Claims, 10 Drawing Sheets

(56) References Cited

U.S. PATENT DOCUMENTS

| | | | | |
|---|---|---|---|---|
| 2015/0032897 | A1* | 1/2015 | Deshpande | H04L 43/0817 709/226 |
| 2015/0341240 | A1* | 11/2015 | Iyoob | G06Q 10/06 709/201 |
| 2016/0283271 | A1* | 9/2016 | Ashby, Jr. | G06F 9/5072 |

* cited by examiner

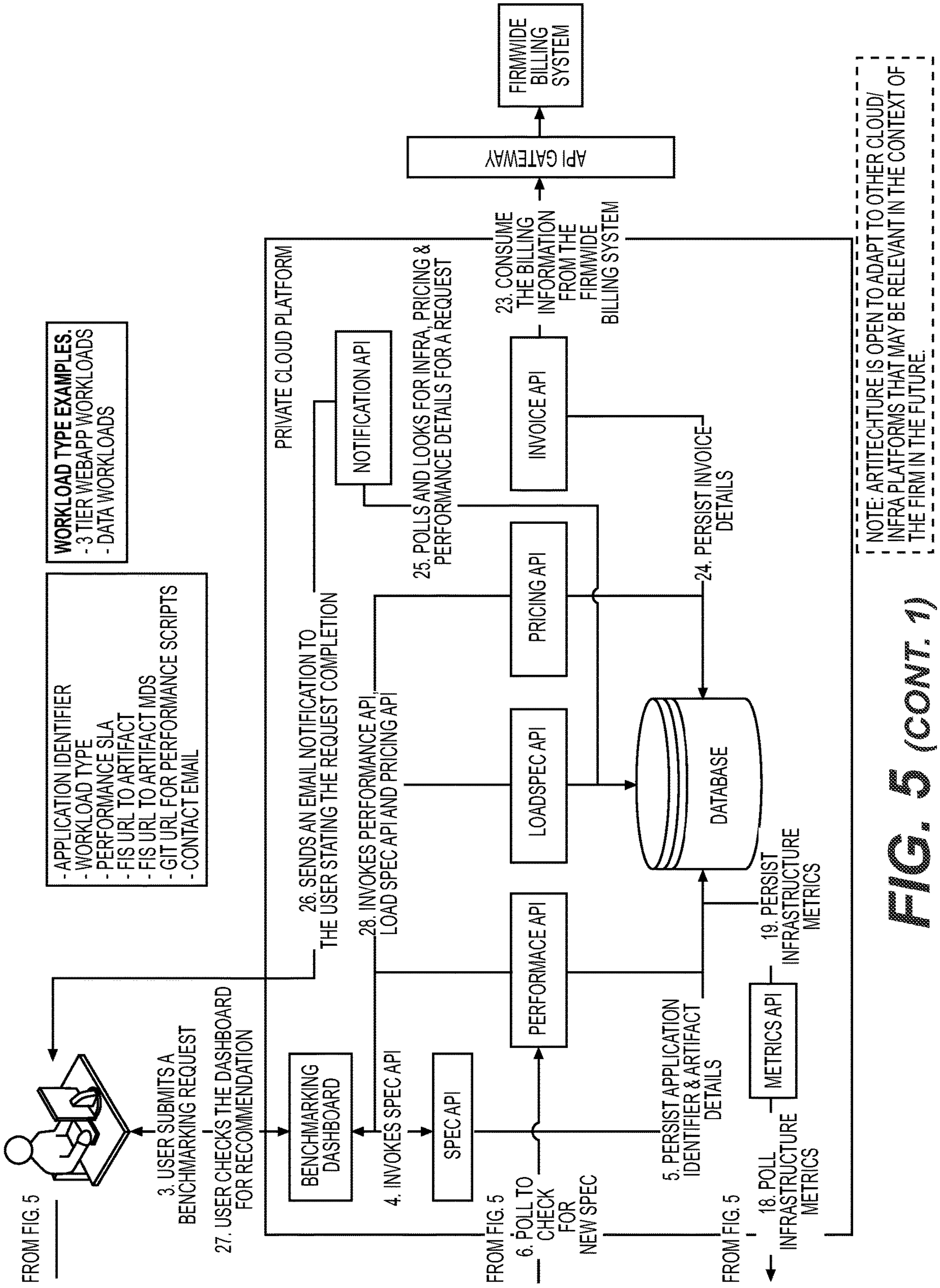
FIG. 5 (CONT. 1)

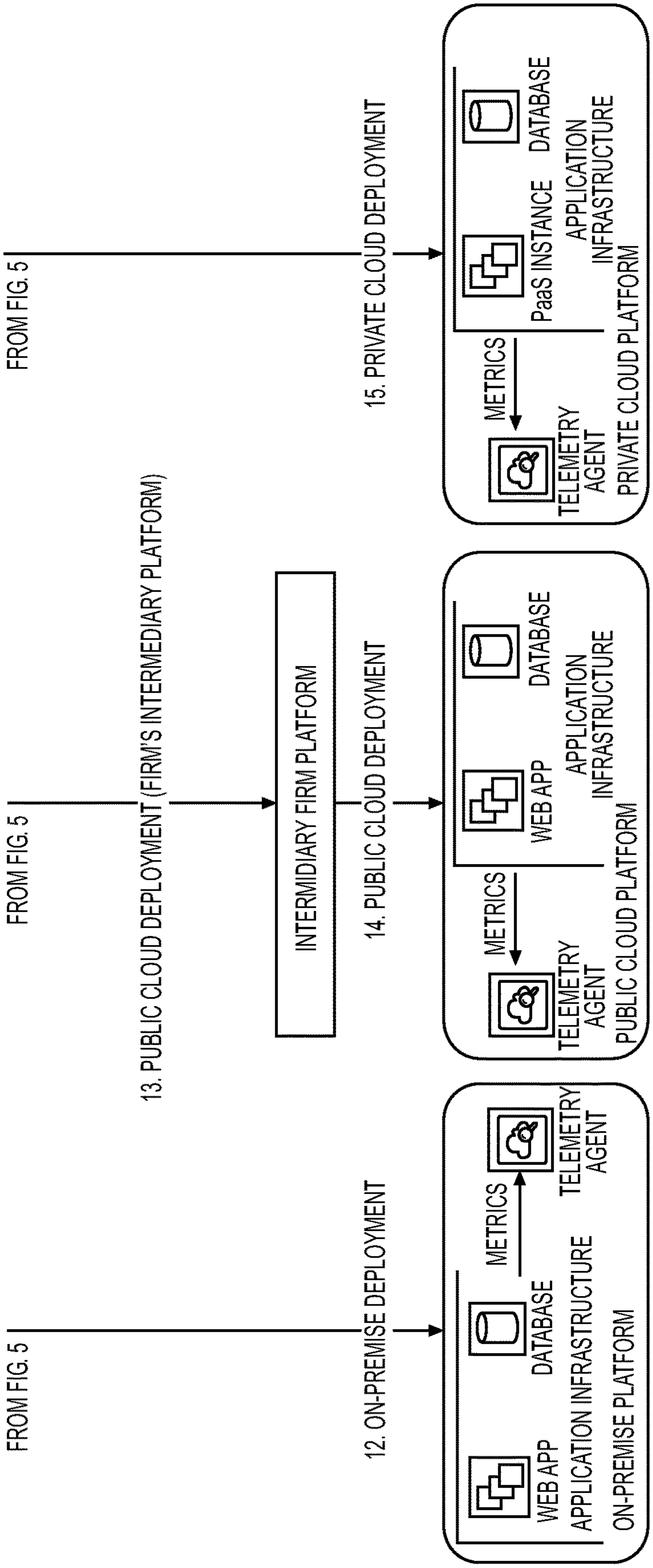
FIG. 5 (CONT. 2)

600

700

800

METHOD AND SYSTEM FOR PROVIDING APPLICATION HOSTING BENCHMARKS

CROSS-REFERENCE TO RELATED APPLICATIONS

This application claims the benefit of Indian Provisional Patent Application No. 202111007629, filed Feb. 23, 2021, which is hereby incorporated by reference in its entirety. This application also claims the benefit of U.S. Provisional Patent Application Ser. No. 63/171,295, filed Apr. 6, 2021, which is hereby incorporated by reference in its entirety.

BACKGROUND

1. Field of the Disclosure

This technology generally relates to methods and systems for benchmarking application hosts, and more particularly to methods and systems for providing predictive cost and performance analytics to facilitate benchmarking of a plurality of networked environments for application hosting.

2. Background Information

Many business entities provide services to customers and employees by utilizing numerous applications. These business entities often utilize a variety of different types of networked environments such as, for example, a public cloud operating environment, a private cloud operating environment, and an on-premise operating environment to host workloads for the applications. Historically, conventional methodologies for determining which specific type of networked environment to utilize for hosting application workloads in different scenarios have resulted in varying degrees of success with respect to optimizing costs and performance.

One drawback of using conventional methodologies is that in many instances, only cursory data such as, for example, cost per compute load are available to decision makers. As a result, the decision to host a particular application instance on a particular type of networked environment is not cost and performance optimized for different operating scenarios as well as for different application requirements. Additionally, with concrete application performance data only available after the application workload has been hosted for a certain time, satisfaction of application performance requirements may not be guaranteed in advance for any selected networked environment.

Therefore, there is a need to determine an optimal networked environment for hosting an application according to different operating scenarios by simulating corresponding application artifacts to derive irrefutable cost and performance data for various application workloads.

SUMMARY

The present disclosure, through one or more of its various aspects, embodiments, and/or specific features or sub-components, provides, inter alia, various systems, servers, devices, methods, media, programs, and platforms for providing predictive cost and performance analytics to facilitate benchmarking of a plurality of networked environments for application hosting.

According to an aspect of the present disclosure, a method for providing predictive cost and performance analytics to facilitate benchmarking of an application host is disclosed.

The method is implemented by at least one processor. The method may include receiving, via a graphical user interface, at least one input, the at least one input may include a request to benchmark at least one networked environment to host an application; retrieving, from a repository based on the at least one input, at least one data storage object that corresponds to the application, the at least one data storage object may include at least one from among a deployment artifact and a performance script; simulating, based on the retrieved at least one data storage object, deployment of the application in the at least one networked environment; collecting, from the at least one networked environment, a result of the simulation, the result may include at least one metric that corresponds to the application; and determining, by using at least one model, predicted implementation information that corresponds to the application based on the result.

In accordance with an exemplary embodiment, the method may further include retrieving, from the at least one model, the predicted implementation information; retrieving, from the at least one networked environment, performance data and hardware data; deriving pricing information for the at least one networked environment based on the retrieved performance data and the retrieved hardware data, the pricing information may include at least one from among daily pricing information for the at least one networked environment and monthly pricing information for the at least one networked environment; and displaying, via the graphical user interface, at least one from among the predicted implementation information, the performance data, the hardware data, and the derived pricing information in response to the at least one input.

In accordance with an exemplary embodiment, the graphical user interface may include at least one dashboard that presents a unified set of data about a series of disparate topics.

In accordance with an exemplary embodiment, the performance data may include an application latency value that corresponds to deployment of the data object in the at least one networked environment and an industry standard latency value for the at least one networked environment.

In accordance with an exemplary embodiment, the hardware data may include a provisioned hardware value relating to an amount of hardware that was dynamically provisioned to achieve a desired application latency value for the at least one networked environment.

In accordance with an exemplary embodiment, the method may further include collecting, in real-time, at least one metric from the at least one networked environment, the at least one metric may include at least one real-time infrastructure metric and at least one real-time application performance metric; and persisting the at least one metric in a database, such that the at least one networked environment may include at least one from among a public cloud network, a private cloud network, and an on-premise network, the on-premise network may include a locally hosted computing infrastructure.

In accordance with an exemplary embodiment, the deployment artifact in the retrieved at least one data storage object may be provisioned according to the at least one networked environment prior to the simulation.

In accordance with an exemplary embodiment, the at least one model may include at least one from among a performance model and a pricing model.

In accordance with an exemplary embodiment, the predicted implementation information may include at least one from among a predicted cost to host the application in the at least one networked environment and a predicted performance of the application in the at least one networked environment.

According to an aspect of the present disclosure, a computing device configured to implement an execution of a method for providing predictive cost and performance analytics to facilitate benchmarking of an application host is disclosed. The computing device including a processor; a memory; and a communication interface coupled to each of the processor and the memory, wherein the processor may be configured to receive, via a graphical user interface, at least one input, the at least one input may include a request to benchmark at least one networked environment to host an application; retrieve, from a repository based on the at least one input, at least one data storage object that corresponds to the application, the at least one data storage object may include at least one from among a deployment artifact and a performance script; simulate, based on the retrieved at least one data storage object, deployment of the application in the at least one networked environment; collect, from the at least one networked environment, a result of the simulation, the result may include at least one metric that corresponds to the application; and determine, by using at least one model, predicted implementation information that corresponds to the application based on the result.

In accordance with an exemplary embodiment, the processor may be further configured to retrieve, from the at least one model, the predicted implementation information; retrieve, from the at least one networked environment, performance data and hardware data; derive pricing information for the at least one networked environment based on the retrieved performance data and the retrieved hardware data, the pricing information may include at least one from among daily pricing information for the at least one networked environment and monthly pricing information for the at least one networked environment; and display, via the graphical user interface, at least one from among the predicted implementation information, the performance data, the hardware data, and the derived pricing information in response to the at least one input.

In accordance with an exemplary embodiment, the graphical user interface may include at least one dashboard that presents a unified set of data about a series of disparate topics.

In accordance with an exemplary embodiment, the performance data may include an application latency value that corresponds to deployment of the data object in the at least one networked environment and an industry standard latency value for the at least one networked environment.

In accordance with an exemplary embodiment, the hardware data may include a provisioned hardware value relating to an amount of hardware that was dynamically provisioned to achieve a desired application latency value for the at least one networked environment.

In accordance with an exemplary embodiment, the processor may be further configured to collect, in real-time, at least one metric from the at least one networked environment, the at least one metric may include at least one real-time infrastructure metric and at least one real-time application performance metric; and persist the at least one metric in a database, such that the at least one networked environment may include at least one from among a public cloud network, a private cloud network, and an on-premise network, the on-premise network may include a locally hosted computing infrastructure.

In accordance with an exemplary embodiment, the processor may be further configured to provision the deployment artifact in the retrieved at least one data storage object according to the at least one networked environment prior to the simulation.

In accordance with an exemplary embodiment, the at least one model may include at least one from among a performance model and a pricing model.

In accordance with an exemplary embodiment, the predicted implementation information may include at least one from among a predicted cost to host the application in the at least one networked environment and a predicted performance of the application in the at least one networked environment.

According to an aspect of the present disclosure, a non-transitory computer readable storage medium storing instructions for providing predictive cost and performance analytics to facilitate benchmarking of an application host is disclosed. The storage medium including executable code which, when executed by a processor, may cause the processor to receive, via a graphical user interface, at least one input, the at least one input may include a request to benchmark at least one networked environment to host an application; retrieve, from a repository based on the at least one input, at least one data storage object that corresponds to the application, the at least one data storage object may include at least one from among a deployment artifact and a performance script; simulate, based on the retrieved at least one data storage object, deployment of the application in the at least one networked environment; collect, from the at least one networked environment, a result of the simulation, the result may include at least one metric that corresponds to the application; and determine, by using at least one model, predicted implementation information that corresponds to the application based on the result.

In accordance with an exemplary embodiment, the predicted implementation information may include at least one from among a predicted cost to host the application in the at least one networked environment and a predicted performance of the application in the at least one networked environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
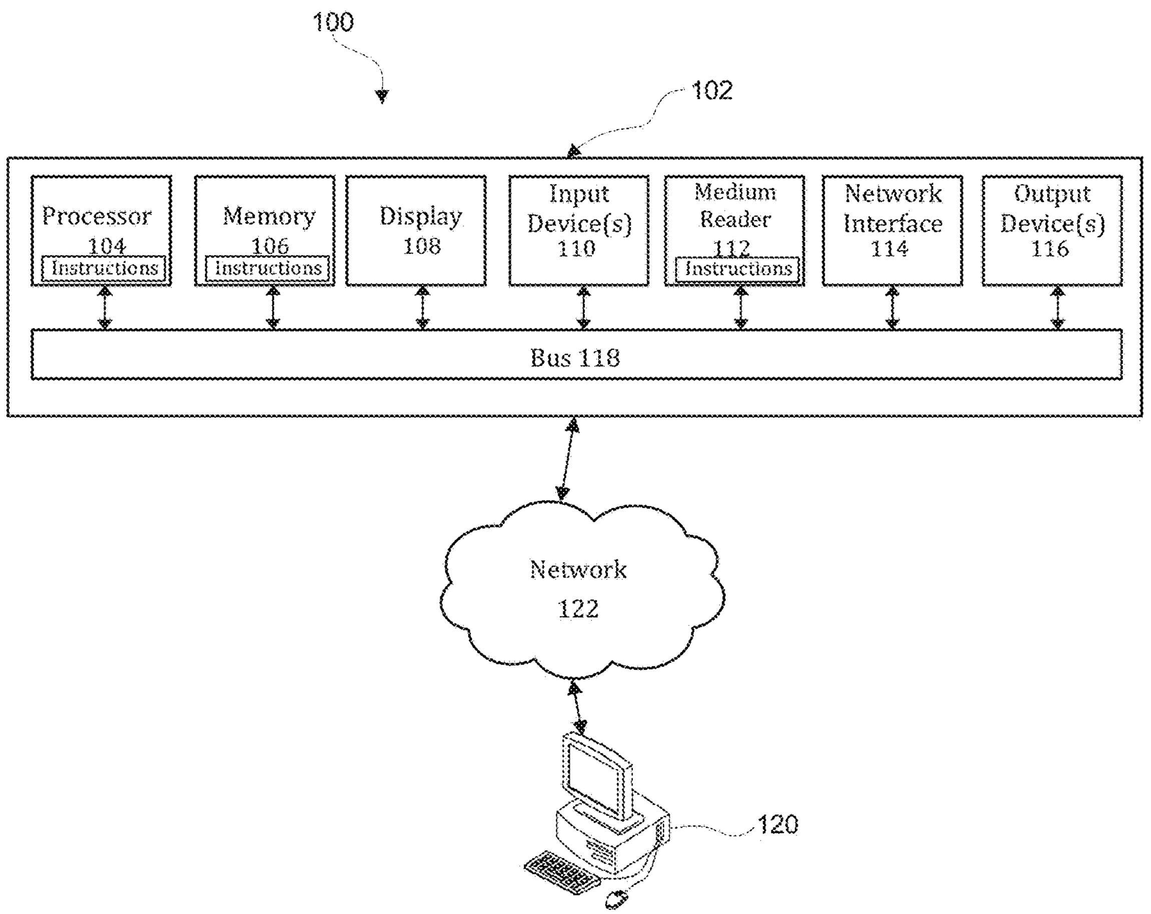
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing predictive cost and performance analytics to facilitate benchmarking of a plurality of networked environments for application hosting.

Figure 2:
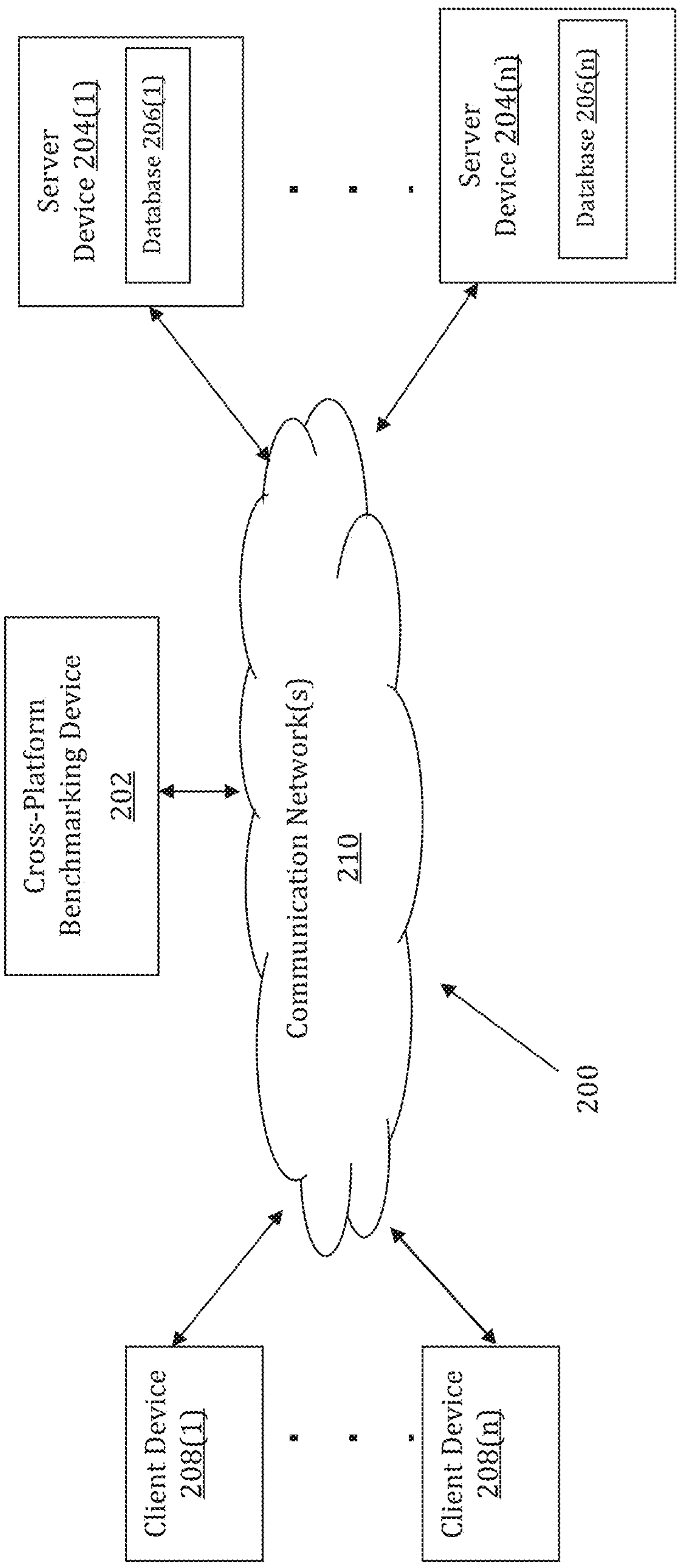
FIG. 2 illustrates an exemplary diagram of a network environment.

Referring to FIG. 2, a schematic of an exemplary network environment 200 for implementing a method for providing predictive cost and performance analytics to facilitate benchmarking of a plurality of networked environments for application hosting is illustrated. In an exemplary embodiment, the method is executable on any networked computer platform, such as, for example, a personal computer (PC).

The method for providing predictive cost and performance analytics to facilitate benchmarking of a plurality of networked environments for application hosting may be implemented by a Cross-Platform Benchmarking (CPB) device 202. The CPB device 202 may be the same or similar to the computer system 102 as described with respect to FIG. 1. The CPB device 202 may store one or more applications that can include executable instructions that, when executed by the CPB device 202, cause the CPB device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CPB device 202 itself, may be located in virtual server(s) running in a cloud-based computing environment rather than being tied to one or more specific physical network computing devices. Also, the application(s) may be running in one or more virtual machines (VMs) executing on the CPB device 202. Additionally, in one or more embodiments of this technology, virtual machine(s) running on the CPB device 202 may be managed or supervised by a hypervisor.

In the network environment 200 of FIG. 2, the CPB device 202 is coupled to a plurality of server devices 204(1)-204(*n*) that hosts a plurality of databases 206(1)-206 (*n*), and also to a plurality of client devices 208(1)-208(*n*) via communication network(s) 210. A communication interface of the CPB device 202, such as the network interface 114 of the computer system 102 of FIG. 1, operatively couples and communicates between the CPB device 202, the server devices 204(1)-204(*n*), and/or the client devices 208 (1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CPB device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CPB devices that efficiently implement a method for providing predictive cost and performance analytics to facilitate benchmarking of a plurality of networked environments for application hosting.

By way of example only, the communication network(s) 210 may include local area network(s) (LAN(s)) or wide area network(s) (WAN(s)) as well as virtual private network (s) (VPN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CPB device 202 may be a standalone device or integrated with one or more other devices or apparatuses, such as one or more of the server devices 204(1)-204(*n*), for example. In one particular example, the CPB device 202 may include or be hosted by one of the server devices 204(1)-204(*n*), and other arrangements are also possible. Moreover, one or more of the devices of the CPB device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the CPB device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store data that relates to application deployable artifacts, performance scripts, cost metrics, performance metrics, predicted implementation information, platform pricing metrics, and billing information.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the CPB device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the CPB device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the CPB device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CPB device 202, the server devices 204(1)-204(*n*), or the client devices 208(1)-208(*n*), for example, may be configured to operate as virtual instances on the same physical machine. In other words, one or more of the CPB device 202, the server devices 204(1)-204(*n*), or the client devices 208(1)-208(*n*) may operate on the same physical device rather than as separate devices communicating through communication network(s) 210. Additionally, there may be more or fewer CPB devices 202, server devices 204(1)-204(*n*), or client devices 208(1)-208 (*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
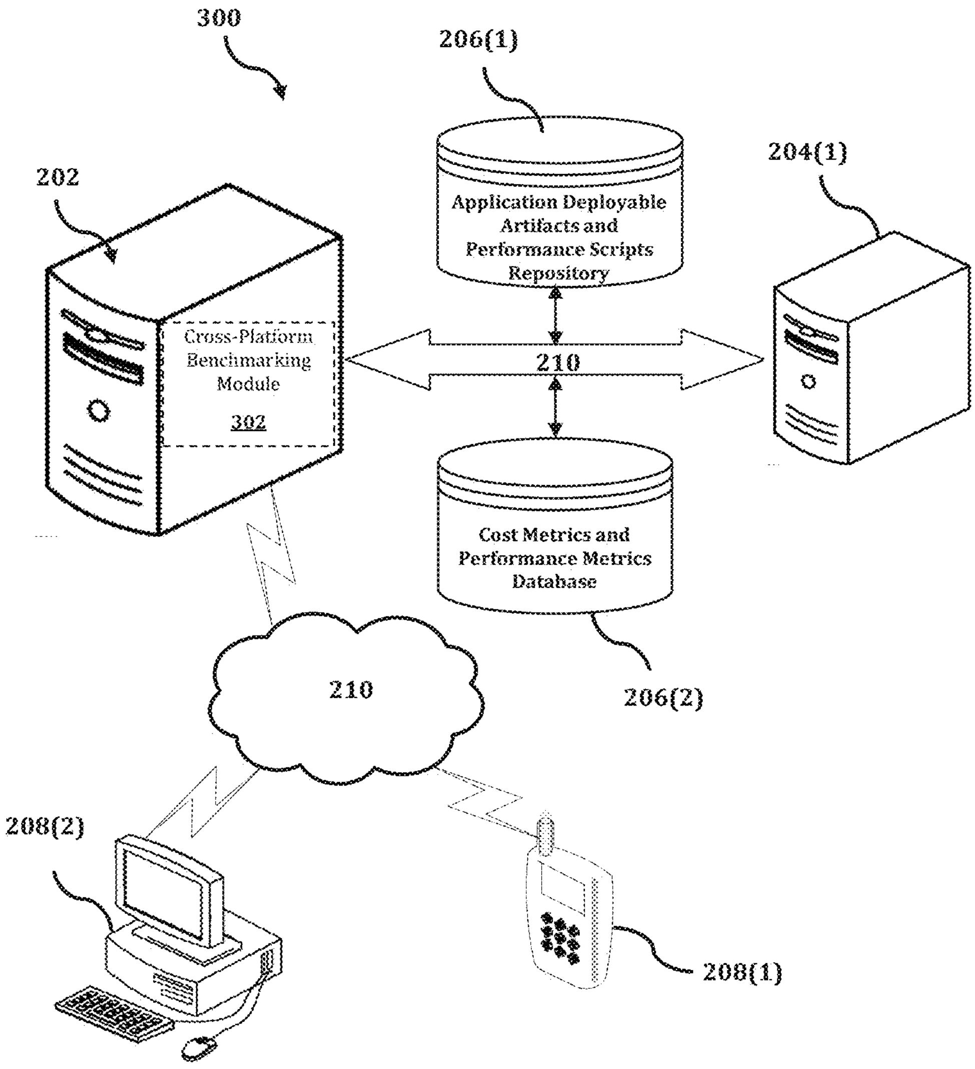
FIG. 3 shows an exemplary system for implementing a method for providing predictive cost and performance analytics to facilitate benchmarking of a plurality of networked environments for application hosting.

The CPB device 202 is described and shown in FIG. 3 as including a cross-platform benchmarking module 302, although it may include other rules, policies, modules, databases, or applications, for example. As will be described below, the cross-platform benchmarking module 302 is configured to implement a method for providing predictive cost and performance analytics to facilitate benchmarking of a plurality of networked environments for application hosting.

An exemplary process 300 for implementing a mechanism for providing predictive cost and performance analytics to facilitate benchmarking of a plurality of networked environments for application hosting by utilizing the network environment of FIG. 2 is shown as being executed in FIG. 3. Specifically, a first client device 208(1) and a second client device 208(2) are illustrated as being in communication with CPB device 202. In this regard, the first client device 208(1) and the second client device 208(2) may be "clients" of the CPB device 202 and are described herein as such. Nevertheless, it is to be known and understood that the first client device 208(1) and/or the second client device 208(2) need not necessarily be "clients" of the CPB device 202, or any entity described in association therewith herein. Any additional or alternative relationship may exist between either or both of the first client device 208(1) and the second client device 208(2) and the CPB device 202, or no relationship may exist.

Further, CPB device 202 is illustrated as being able to access an application deployable artifacts and performance scripts repository 206(1) and a cost metrics and performance metrics database 206(2). The cross-platform benchmarking module 302 may be configured to access these databases for implementing a method for providing predictive cost and performance analytics to facilitate benchmarking of a plurality of networked environments for application hosting.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CPB device 202 via broadband or cellular communication. Of course, these embodiments are merely exemplary and are not limiting or exhaustive.

Upon being started, the cross-platform benchmarking module 302 executes a process for providing predictive cost and performance analytics to facilitate benchmarking of a plurality of networked environments for application hosting. An exemplary process for providing predictive cost and performance analytics to facilitate benchmarking of a plurality of networked environments for application hosting is generally indicated at flowchart 400 in FIG. 4.

Figure 4:
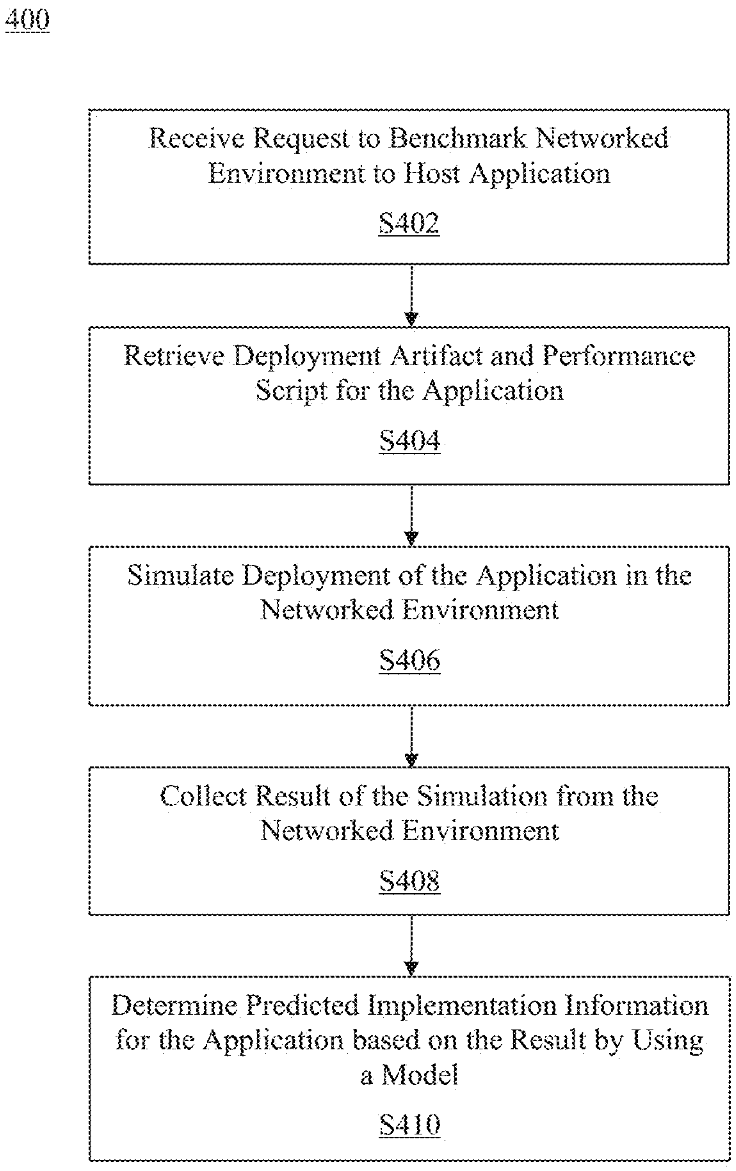
FIG. 4 is a flowchart of an exemplary process for implementing a method for providing predictive cost and performance analytics to facilitate benchmarking of a plurality of networked environments for application hosting.

In the process 400 of FIG. 4, at step S402, an input may be received via a graphical user interface. The input may include a request to benchmark a networked environment to host an application. In an exemplary embodiment, the networked environment may include at least one from among a public cloud network, a private cloud network, and an on-premise network. The public cloud network may include a third-party cloud network such as, for example, AMAZON WEB SERVICES. The private cloud network may include a proprietary cloud network that is developed and operated by a single entity. The on-premise network may include a locally hosted computing infrastructure.

In another exemplary embodiment, the benchmarking of a networked environment for an application may determine a standard and/or a point of reference for the networked environment which may be used for comparison with other networked environments. The networked environment may be benchmarked based on predetermined requirements such as, for example, a service-level agreement (SLA) for various operating scenarios. For example, the networked environment may be benchmarked to determine a hosting cost when the application workload is hosted on the networked environment for a predetermined time. As will be appreciated by a person of ordinary skill in the art, the networked environments may be benchmarked to determine a plurality of metrics such as, for example, a price metric, a performance metric, etc.

In another exemplary embodiment, the benchmarking of a networked environment for an application may determine a predicted standard and/or a predicted point of reference for the networked environment which may be used for comparison with other networked environments. The networked environment may be benchmarked to determine a future metric such as, for example, a future hosting cost based on an extrapolation of a present metric that is determined when the application workload is hosted on the networked environment for a predetermined time. For example, based on a one dollar per day cost metric for hosting an application in a networked environment, the benchmarking may extrapolate the per day cost metric to determine that the price to host the application in the networked environment for a week would be seven dollars. As will be appreciated by a person of ordinary skill in the art, the networked environments may be benchmarked to determine a plurality of predicted metrics such as, for example, a price metric, a performance metric, etc.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, a data storage object that corresponds to the application may be retrieved from a repository based on the input. In an exemplary embodiment, the data storage object may include at least one from among a deployment artifact and a performance script. The data storage object may correspond to an object for storing data on a computer such as, for example, a computer file that stores data, information, settings, and commands. In another exemplary embodiment, the repository may include a firmwide immutable store that contains a plurality of deployable artifacts as well as a code repository such as, for example, a BITBUCKET repository that contains a plurality of application performance scripts.

At step S406, deployment of the application in the networked environment may be simulated based on the retrieved data storage object. In an exemplary embodiment, the retrieved deployment artifacts may be provisioned by an infrastructure provisioning server prior to simulation. The infrastructure provisioning server may provision the deployment artifacts according to the networked environment to be tested by managing access to data and resources for the deployment artifact. In another exemplary embodiment, the infrastructure provisioning server may provision the deployment artifacts based on a networked environment such as, for example, an on-premise networked environment, a public cloud networked environment, and a private cloud networked environment.

In another exemplary embodiment, a performance server such as, for example, a load performance server may be used to simulate a workload of the application. The parameters for the simulated workload may correspond to the retrieved data storage object and the received input. The performance server may run performance tests for the application across a plurality of networked environments by simulating a real-world workload for each of the plurality of networked environments. In another exemplary embodiment, the performance server may simulate the workload of the application based on a predetermined performance characteristic that is specified in the input. The workload may be predetermined by a user based on a desired operating requirement. In another exemplary embodiment, the workload may include various types of workloads for the application in the networked environment.

At step S408, a result of the simulation may be collected from the networked environment. The result may include a plurality of metrics that correspond to the application. In an exemplary embodiment, the result of the simulation may be collected by a listening server such as, for example, an event monitoring server that is connected with the networked environment. The listening server may monitor messages from the networked environment to compile a plurality of application related metrics. In another exemplary embodiment, the metric may include a plurality of metrics such as, for example, a pricing metric and a performance metric.

At step S410, predicted implementation information that corresponds to the application may be determined based on the collected result of the simulation by using a model. In an exemplary embodiment, the predicted implementation information may include at least one from among a predicted cost to host the application in the networked environment and a predicted performance of the application in the networked environment. The predicted implementation information may correspond to an anticipated future operating state of the application in a specific networked environment.

In another exemplary embodiment, the predicted implementation information may relate to a future operating metric such as, for example, a future hosting cost based on an extrapolation of the collected result of the simulation. For example, based on a one dollar per day cost metric for hosting an application in a specific networked environment, the model may extrapolate the per day cost metric to determine that the price to host the application in the specific networked environment for a week would be seven dollars. In another exemplary embodiment, the predicted implementation information may be determined for a plurality of networked environments. Baseline performance for each of the plurality of networked environments may be kept constant to facilitate a determination of potential cost savings for a certain performance requirement across the plurality of networked environments.

In another exemplary embodiment, the model may include at least one from among a performance model and a pricing model. The model may utilize a corresponding application programming interface (API) to retrieve the collected result of the simulation. In another exemplary embodiment, the collected result of the simulation may include infrastructure specification from the networked environment. The infrastructure specification may include infrastructure related information such as, for example, an amount of the infrastructure that was used to achieve the application service-level agreement (SLA).

In another exemplary embodiment, the model may correspond to a specific networked environment and contain information that relates to the specific networked environment. For example, a pricing model for a public cloud platform may contain billing information such as application licensing cost for the public cloud platform. In another exemplary embodiment, the model may be updated to accommodate a change in requirements for the networked environment. The model may be updated manually by a system administrator as well as automatically by an integrated system. For example, when the application licensing cost for the public cloud platform is increased, the model may be updated to accommodate the change.

In another exemplary embodiment, the predicted implementation information may be retrieved from the model. Performance data and hardware data may also be retrieved from the networked environment. Then, pricing information for the networked environment may be derived based on the retrieved performance data and the hardware data. In another exemplary embodiment, the pricing information may include detailed daily and monthly pricing information for each networked environment. The retrieved predicted implementation information, the retrieved performance data, the retrieved hardware data, and the derived pricing information may be displayed via the graphical user interface in response to the input.

In another exemplary embodiment, the performance data may include an application latency value that corresponds to the deployment of the data object in the networked environment as well as an industry standard latency value for the networked environment. For example, the graphical user interface may provide performance data based on the application latency (i.e., application SLA provided by the customer) that was achieved for the deployed artifacts as well as where the application latency stands with respect to industry standards for each of the platforms.

In another exemplary embodiment, the hardware data may include a provisioned hardware value relating to an amount of hardware that was dynamically provisioned to achieve a desired application latency value for the networked environment. For example, the graphical user interface may show how much hardware was dynamically provisioned to achieve a desired application latency (i.e., application SLA provided by the customer) for each of the platforms.

In another exemplary embodiment, the collected result of the simulation may be retrieved from a database. The retrieved result may also be displayed via the graphical user interface in response to the input. In another exemplary embodiment, a notification may be implemented to alert the user that that predicted implementation information is available for viewing. The notification may include a graphical alert such as, for example, a popup on the graphical user interface as well as an electronically communicated alert such as, for example an email message alert.

In another exemplary embodiment, the graphical user interface may include a dashboard that provides a unified set of data about a series of disparate topics. The graphical user interface may correspond to a visual way of interacting with a computer by using graphical elements such as, for example, windows, icons, and menus. In another exemplary embodiment, the dashboard may include a software-based control panel to display the predicted implementation information. The dashboard may display simulated gauges and dials as well as graphics such as, for example, pie charts, bar charts, pie graphs, and bar graphs.

In another exemplary embodiment, the predicted implementation information and the retrieved result may be displayed via the graphical user interface based on a predetermined user setting. For example, the user may select graphical elements on the graphical user interface to indicate specific data to be displayed. In another exemplary embodiment, the predicted implementation information and the retrieved result may be displayed via the graphical user interface in a textual format, in a graphical format, as well as any combination of textual formats and graphical formats. For example, the predicted implementation information and the retrieved result may be displayed via the graphical user interface in a chart and/or table with both graphical elements and textual elements.

In another exemplary embodiment, the claimed invention may include a real-time application and infrastructure (RTAI) metrics collection engine. The RTAI metrics collection engine may correspond to an integrated component that captures application metrics and infrastructure metrics in real-time consistent with present disclosures. The RTAI metrics collection engine may facilitate aggregation of various metrics by collecting, in real-time, metrics from the networked environments. The metrics may include real-time infrastructure metrics and real-time application performance metrics. Then, the collected metrics may be persisted in a database consistent with present disclosures. In another exemplary embodiment, the networked environments may include at least one from among a public cloud network, a private cloud network, and an on-premise network. The on-premise network may include a locally hosted computing infrastructure.

Figure 5:
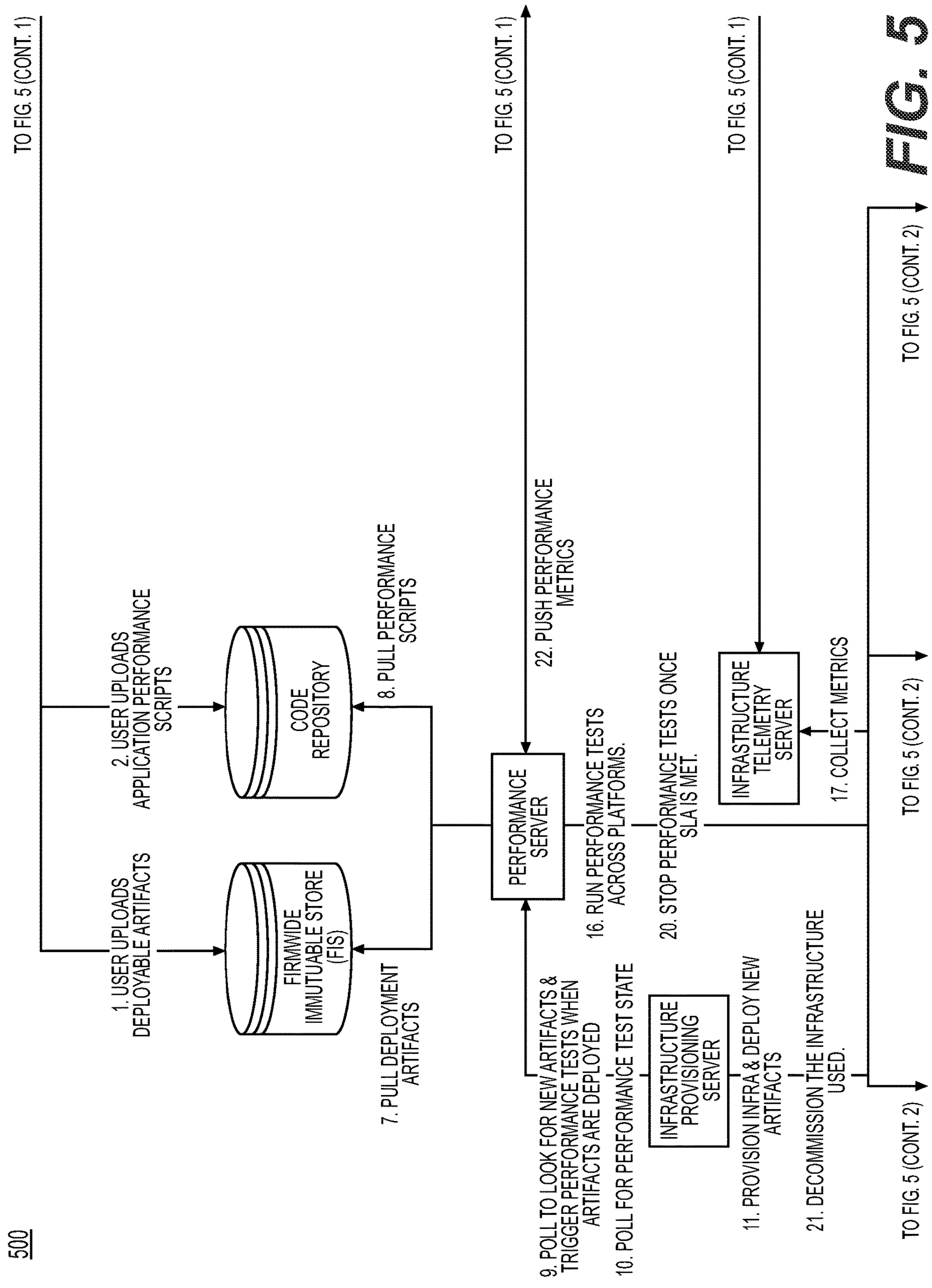
FIG. 5 is a flow diagram of an exemplary benchmarking architecture that is integrated with a firmwide billing system for implementing a method for providing predictive cost and performance analytics to facilitate benchmarking of a plurality of networked environments for application hosting.

FIG. 5 is a flow diagram 500 of an exemplary benchmarking architecture that is integrated with a firmwide billing system for implementing a method for providing predictive cost and performance analytics to facilitate benchmarking of a plurality of networked environments for application hosting. In FIG. 5, the exemplary benchmarking architecture simulates the application workload in a private cloud platform, an on-premise infrastructure, and a public cloud platform via a deployment platform to integrate the simulation process with existing network infrastructure and facilitate the use of an upload application programming interface (API) to consume the billing information directly from a firmwide billing system. Additionally, in FIG. 5, steps 1 to 5 may correspond to an onboarding process, steps 6-22 may correspond to an infrastructure provisioning and performance metric collection process, steps 23-26 may correspond to an infrastructure billing process, and steps 27-28 may correspond to a benchmark dashboarding process.

As illustrated in FIG. 5, for the onboarding process at step 1, a user may upload deployable artifacts such as, for example, web application jars for an application into a bucket such as, for example, a S3 bucket in a firmwide immutable store. Similarly, at step 2, the user may also upload application related performance scripts for the application into a code repository such as, for example, a GIT repository and/or a BITBUCKET repository. At step 3, the user may submit a benchmarking request for an application via a benchmarking dashboard. In an exemplary embodiment, the benchmarking request may include application information such as, for example, an application identifier, an application workload type, an application performance service-level agreement (SLA), an identifier uniform resource locator (URL) to a corresponding artifact, a BITBUCKET URL for corresponding performance scripts, and a contact email. At step 4, a specification API may be invoked by the benchmarking dashboard to persist the request details. Then, at step 5, the request details may be persisted in a strategic database by the specification API with a "NEW" state.

For the infrastructure provisioning and performance metric collection process at step 6, a performance API may be polled by a performance server to check for any requests with the "NEW" state. When a request with the "NEW" state is found, the performance API may mark the request as "IN PROGRESS" and may send the request details to the performance server. In another exemplary embodiment, the performance server may include a remote distributed testing server such as, for example, a JMETER cluster that may be utilized to simulate a load for stress testing. At step 7, the performance server may pull deployment artifacts that corresponds to the application from the firmwide immutable store. Likewise, at step 8, the performance server may also pull performance scripts that correspond to the application from the code repository.

At step 9, the infrastructure provisioning server may poll the performance server to identify new artifacts and trigger performance tests with application URLs when the deployment artifacts are deployed. In another exemplary embodiment, the infrastructure provisioning server may serve as a workload orchestrator based on implemented components. At step 10, the infrastructure provisioning server may poll the performance server in a parallel process to obtain a performance testing state such as, for example, a started state and a stopped state for existing artifacts. At step 11, the infrastructure provisioning server may provision the infrastructures with the smallest footprint available that is dynamically scalable for a networked environment such as, for example, an on-premise networked environment, a public cloud networked environment, and a private cloud networked environment.

At step 12, the infrastructure provisioning server may deploy the application/workload to an on-premise platform by using an infrastructure as code software tool. In another exemplary embodiment, the on-premise platform may deploy the application as a web application in an application infrastructure that records resulting metrics to an event monitoring system such as, for example, a telemetry agent.

At step 13, the provisioned deployment artifact may be deployed by the infrastructure provisioning server in a proprietary, intermediate deployment platform that is integrated with a public cloud platform. Then, at step 14, the proprietary, intermediate deployment platform deploys the application in the public cloud platform. In another exemplary embodiment, the public cloud platform may deploy the application as a web application in an application infrastructure that records resulting metrics to an event monitoring system such as, for example, a telemetry agent.

At step 15, the infrastructure provisioning server may push the provisioned deployment artifact to a private cloud platform. In another exemplary embodiment, the private cloud platform may deploy the application as an instance in an application infrastructure that records resulting metrics to an event monitoring system such as, for example, a telemetry agent.

At step 16, a distributed testing cluster may be initiated within the performance server to execute the performance scripts. At step 17, the telemetry agents in each of the server nodes provide live metrics on the application and corresponding platform to an infrastructure telemetry server. At step 18, a metrics API may poll the infrastructure telemetry APIs to collect infrastructure metrics periodically. At step 19, the metrics API may persist the infrastructure metrics to the strategic database.

At step 20, the performance server may monitor application latency by using the metrics and may stop the executed scripts when a desired application SLA is met. In another exemplary embodiment, step 20 may correspond to a continuously recurring process that perform the stated function until metrics that are received by the performance server indicate that the required application latency (i.e., SLA captured as part of the requirement) is met. At step 21, the infrastructure provisioning server may decommission the previously provisioned infrastructure in step 10. At step 22, the performance server may push the performance metrics to the performance API, which will facilitate the persistence of the performance metrics in the strategic database.

For the infrastructure billing process at step 23, an invoice API may consume billing information from the firmwide billing system via an API gateway. In another exemplary embodiment, due to the integration of resulting billing information with the firmwide billing system, the invoice API may automatically consume the billing information from the firmwide billing system. At step 24, the invoice API may persist invoiced details in a database and may change the benchmarking request state from "IN PROGRESS" to "COMPLETE." At step 25, a notification API may poll the database to look for requests with a "COMPLETE" state. Then, at step 26, the notification API may send an email to a user to notify the user that the benchmarking exercise is completed. The email may include a benchmarking dashboard URL that is specific to a corresponding application identifier of the user. In another exemplary embodiment, the notification may include a graphical interface notification such as, for example, an alert popup on the benchmarking dashboard with corresponding information as well as an electronic communication notification such as, for example, an email message to the user with the corresponding information.

For the benchmark dashboarding process at step 27, the user may access the benchmarking dashboard by using the benchmarking dashboard URL in the notification. The benchmarking dashboard may include information that relates to billing data, infrastructure metrics, performance data, and recommended platforms. The user may utilize the information in the benchmarking dashboard to facilitate deployment of the application. At step 28, the benchmarking dashboard may invoke the performance API, the load specification API, and the pricing API to showcase what infrastructure was used in each of the platforms to achieve the application SLA, the billing metrics, and the performance metrics. In another exemplary embodiment, the benchmarking dashboard may recommend a platform that is ideal for the user and/or a line of business of the user for deployment of the application/workload. The recommendation of the platform may be based on the cost metrics and the performance metrics.

Figure 6:
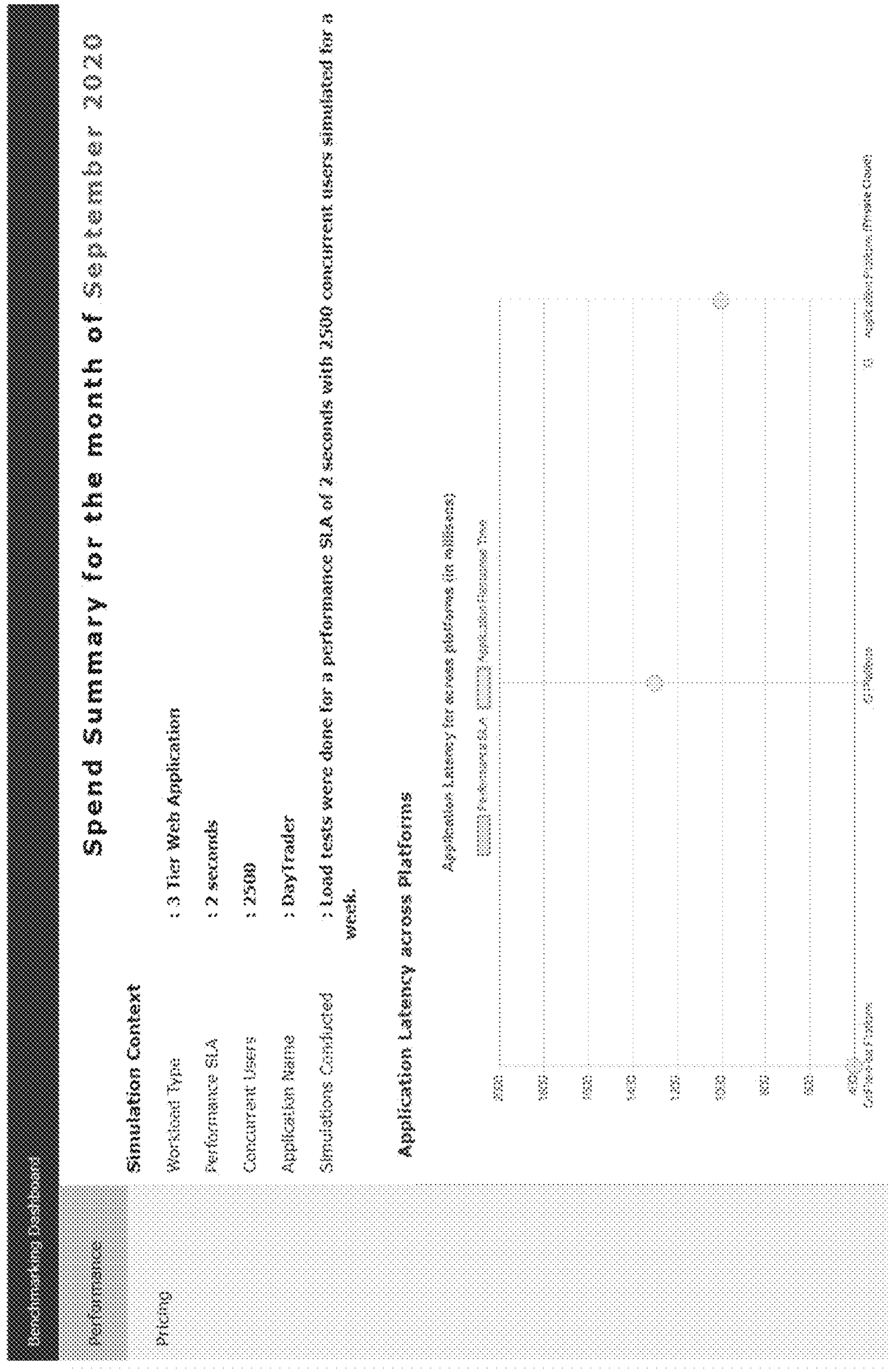
FIG. 6 is a screenshot that illustrates a performance benchmarking dashboard that is usable for implementing a method for providing predictive cost and performance analytics to facilitate benchmarking of a plurality of networked environments for application hosting, according to an exemplary embodiment.

FIG. 6 is a screenshot 600 that illustrates a performance benchmarking dashboard that is usable for implementing a method for providing predictive cost and performance analytics to facilitate benchmarking of a plurality of networked environments for application hosting, according to an exemplary embodiment.

As illustrated in FIG. 6, predicted results from the pricing model relating to the deployment of an application on various networked environments may be displayed for the user in performance charts. In an exemplary embodiment, the benchmarking dashboard graphical user interface (GUI) may provide performance data based on the application latency (i.e., application SLA provided by the customer) that was achieved for the deployed artifacts as well as where the application latency stands with respect to industry standards for each of the networked environments.

Figure 7:
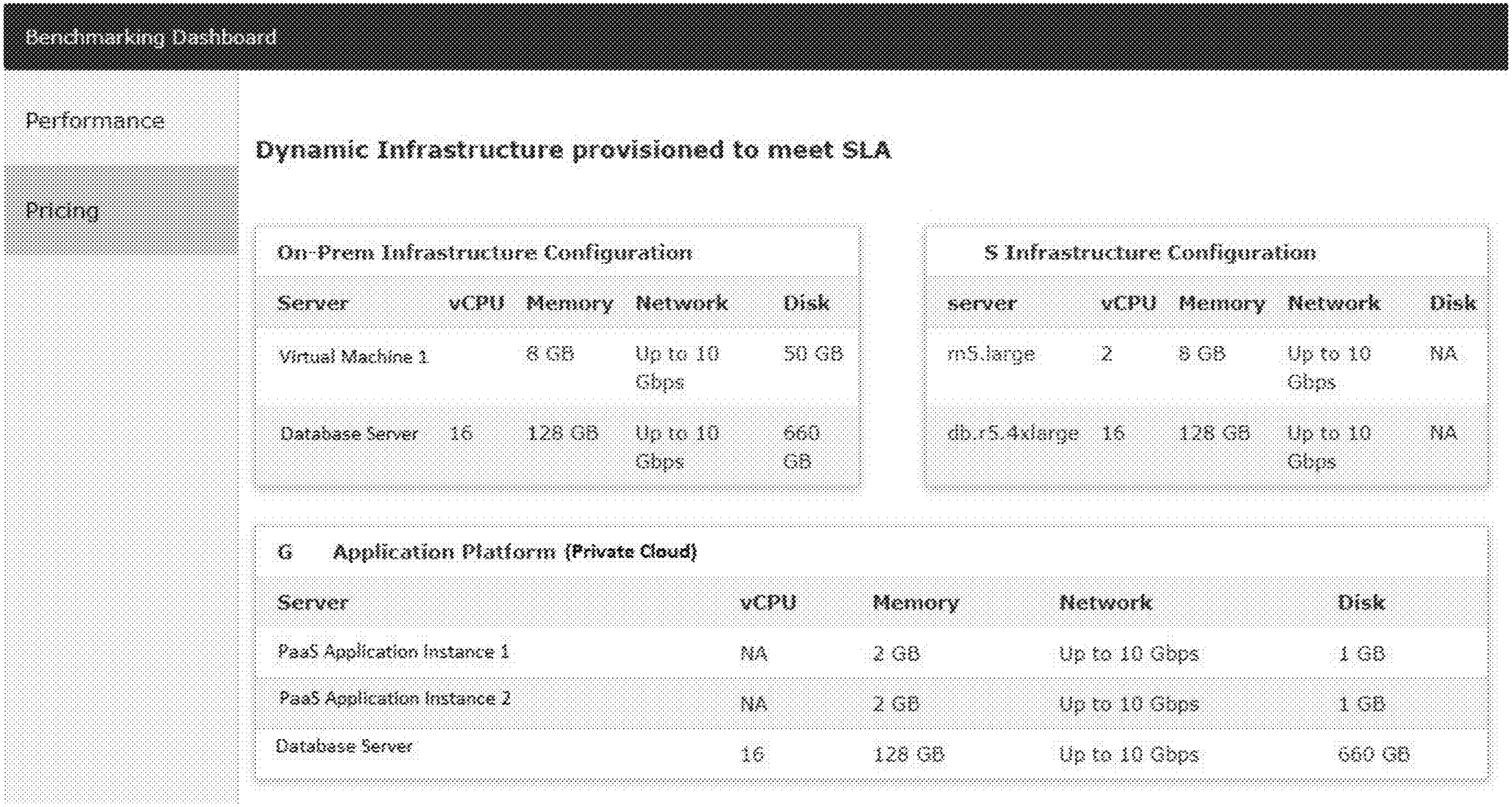
FIG. 7 is a screenshot that illustrates a tabular price benchmarking dashboard that is usable for implementing a method for providing predictive cost and performance analytics to facilitate benchmarking of a plurality of networked environments for application hosting, according to an exemplary embodiment.

FIG. 7 is a screenshot 700 that illustrates a tabular price benchmarking dashboard that is usable for implementing a method for providing predictive cost and performance analytics to facilitate benchmarking of a plurality of networked environments for application hosting, according to an exemplary embodiment.

As illustrated in FIG. 7, predicted results from the pricing model relating to the deployment of an application on various networked environments may be displayed for the user in tabular format. In an exemplary embodiment, the benchmarking dashboard graphical user interface (GUI) may provide information that shows how much hardware was dynamically provisioned to achieve a desired application latency (i.e., application SLA provided by the customer) for each of the networked environments.

Figure 8:
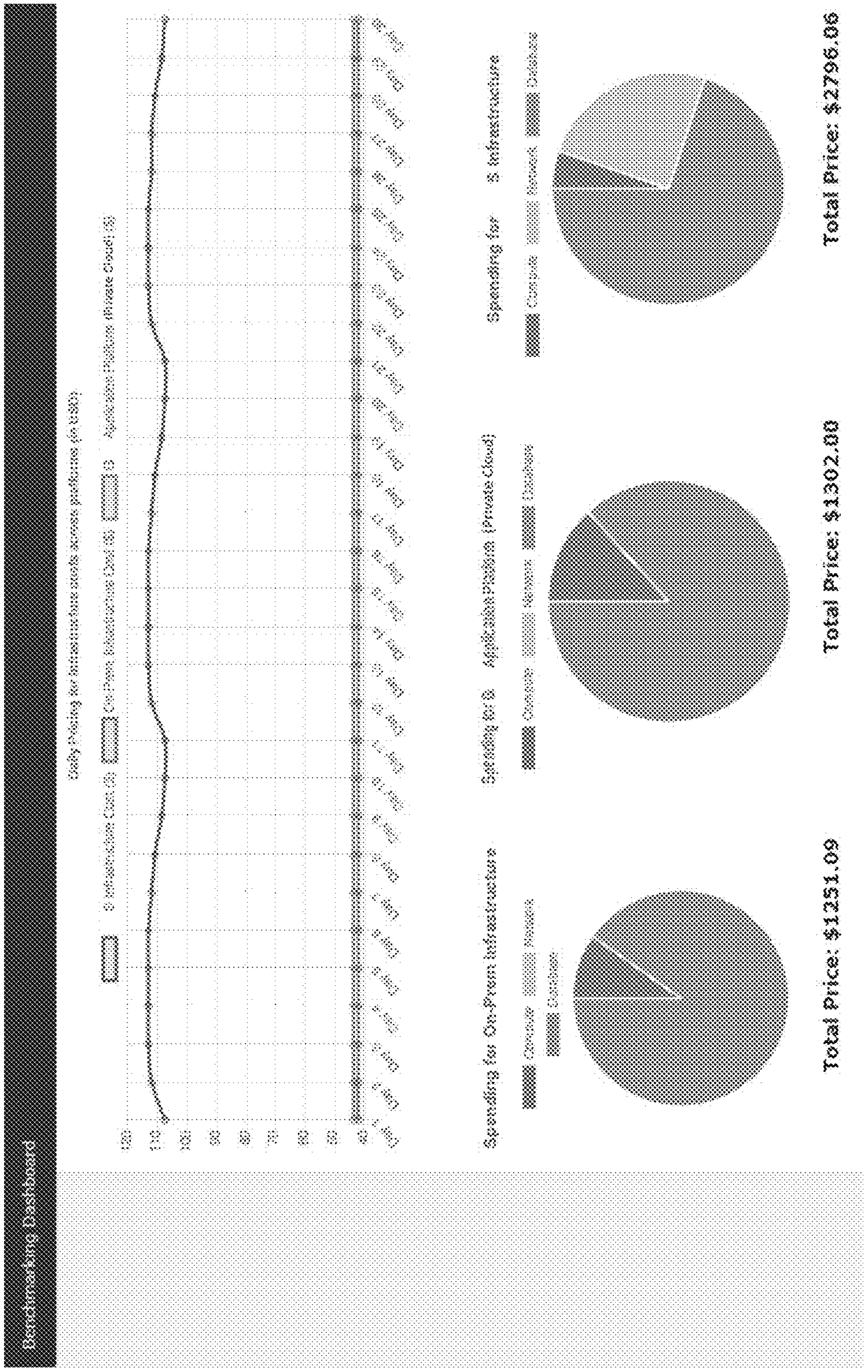
FIG. 8 is a screenshot that illustrates a graphical price benchmarking dashboard that is usable for implementing a method for providing predictive cost and performance analytics to facilitate benchmarking of a plurality of networked environments for application hosting, according to an exemplary embodiment.

FIG. 8 is a screenshot 800 that illustrates a graphical price benchmarking dashboard that is usable for implementing a method for providing predictive cost and performance analytics to facilitate benchmarking of a plurality of networked environments for application hosting, according to an exemplary embodiment.

As illustrated in FIG. 8, predicted results from the pricing model relating to the deployment of an application on various networked environments may be displayed for the user in graphical elements such as, for example, graphs and charts. In an exemplary embodiment, the benchmarking dashboard graphical user interface (GUI) may derive detailed daily pricing information and detailed monthly pricing information for each of the networked environments.

Accordingly, with this technology, an optimized process for providing predictive cost and performance analytics to facilitate benchmarking of a plurality of networked environments for application hosting is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing predictive cost and performance analytics to facilitate benchmarking of an application host, the method being implemented by at least one processor, the method comprising:

receiving, by the at least one processor via a graphical user interface, at least one input, the at least one input including a request to benchmark at least one networked environment to host an application, wherein the at least one networked environment includes a private cloud platform, a public cloud platform, and an on-premises infrastructure;

retrieving, by the at least one processor, from a repository, at least one data storage object that corresponds to the application, the at least one data storage object including at least one from among a deployment artifact and a performance script, wherein the retrieving of the at least one data storage object is based on the at least one input;

integrating, by the at least one processor, a simulation process with respective network infrastructure for the private cloud platform, the public cloud platform, and the on-premises infrastructure, respectively;

simulating, by the at least one processor via a load performance server and the corresponding respective integrated simulation process, respective deployment of the application in the private cloud platform, the public cloud platform, and the on-premises infrastructure, respectively, wherein the load performance server simulates a workload of the application based on the at least one data storage object and the received at least one input;

collecting, by the at least one processor via a listening server, a respective result of each respective corresponding simulation, each respective result including at least one metric that corresponds to hosting of the application, wherein the listening server monitors respective messages from the private cloud platform, the public cloud platform, and the on-premises infrastructure to compile the respective at least one metric for the private cloud platform, the public cloud platform, and the on-premises infrastructure, respectively; and determining, by the at least one processor using at least one model, respective predicted implementation information that corresponds to at least one from among a predicted cost and a predicted performance associated with hosting the application in the private cloud platform, the public cloud platform, and the on-premises infrastructure, respectively, at a future timepoint, wherein the determining of the respective predicted implementation information is based on the corresponding respective results of the simulation.

2. The method of claim 1, further comprising:

retrieving, by the at least one processor from the at least one model, the respective predicted implementation information;

retrieving, by the at least one processor, from the private cloud platform, the public cloud platform, and the on-premises infrastructure, respectively, respective performance data and respective hardware data;

deriving, by the at least one processor, respective pricing information for the private cloud platform, the public cloud platform, and the on-premises infrastructure, respectively, based on the retrieved respective performance data and the retrieved respective hardware data, the respective pricing information including at least one from among respective daily pricing information for the private cloud platform, the public cloud platform, and the on-premises infrastructure, respectively, and respective monthly pricing information for the private cloud platform, the public cloud platform, and the on-premises infrastructure, respectively; and displaying, by the at least one processor via the graphical user interface, at least one from among the respective predicted implementation information, the respective performance data, the respective hardware data, and the respective derived pricing information in response to the at least one input.

3. The method of claim 2, wherein the graphical user interface includes at least one dashboard that presents a unified set of data about a series of disparate topics.

4. The method of claim 2, wherein the performance data includes a respective application latency value that corresponds to deployment of the data object in the private cloud platform, the public cloud platform, and the on-premises infrastructure, respectively.

5. The method of claim 2, wherein the hardware data includes a provisioned hardware value relating to an amount of hardware that was dynamically provisioned to achieve a respective desired application latency value for the private cloud platform, the public cloud platform, and the on-premises infrastructure, respectively.

6. The method of claim 1, further comprising:

storing, by the at least one processor, the at least one metric in a database, wherein the at least one metric includes at least one real-time infrastructure metric and at least one real-time application performance metric, and wherein the on-premises infrastructure includes a locally hosted computing infrastructure.

7. The method of claim 1, wherein the deployment artifact in the retrieved at least one data storage object is provisioned according to the at least one networked environment prior to the simulation.

8. The method of claim 1, wherein the at least one model includes at least one from among a performance model and a pricing model.

9. The method of claim 1, wherein the respective predicted implementation information includes at least one from among a respective predicted cost to host the application in the private cloud platform, the public cloud platform, and the on-premises infrastructure, respectively, and a respective predicted performance of the application in the private cloud platform, the public cloud platform, and the on-premises infrastructure, respectively.

10. A computing device configured to implement an execution of a method for providing predictive cost and performance analytics to facilitate benchmarking of an application host, the computing device comprising:

a processor;

a memory; and a communication interface coupled to each of the processor and the memory, wherein the processor is configured to:

receive, via a graphical user interface, at least one input, the at least one input including a request to benchmark at least one networked environment to host an application, wherein the at least one networked environment includes a private cloud platform, a public cloud platform, and an on-premises infrastructure;

retrieve, from a repository, at least one data storage object that corresponds to the application, the at least one data storage object including at least one from among a deployment artifact and a performance script that is based on the at least one input;

integrate a simulation process with respective network infrastructure for the private cloud platform, the public cloud platform, and the on-premises infrastructure, respectively;

simulate, via a load performance server and the corresponding respective integrated simulation process, respective deployment of the application in the private cloud platform, the public cloud platform, and the on-premises infrastructure, respectively, wherein the load performance server simulates a workload of the application based on the at least one data storage object and the received at least one input;

collect, via a listening server, a respective result of each respective corresponding simulation, each respective result including at least one metric that corresponds to hosting of the application, wherein the listening server monitors respective messages from the private cloud platform, the public cloud platform, and the on-premises infrastructure, respectively, to compile the respective at least one metric for the private cloud platform, the public cloud platform, and the on-premises infrastructure, respectively; and determine, by using at least one model, respective predicted implementation information that corresponds to at least one from among a predicted cost and a predicted performance associated with hosting the application in the private cloud platform, the public cloud platform, and the on-premises infrastructure, respectively, at a future timepoint, wherein the determining of the respective predicted implementation information is based on the corresponding respective results of the simulation.

11. The computing device of claim 10, wherein the processor is further configured to:

retrieve, from the at least one model, the respective predicted implementation information;

retrieve, from the private cloud platform, the public cloud platform, and the on-premises infrastructure, respectively, respective performance data and respective hardware data;

derive respective pricing information for the private cloud platform, the public cloud platform, and the on-premises infrastructure, respectively, based on the retrieved respective performance data and the retrieved respective hardware data, the respective pricing information including at least one from among respective daily pricing information for the private cloud platform, the public cloud platform, and the on-premises infrastructure, respectively, and respective monthly pricing information for the private cloud platform, the public cloud platform, and the on-premises infrastructure, respectively; and display, via the graphical user interface, at least one from among the respective predicted implementation information, the respective performance data, the respective hardware data, and the respective derived pricing information in response to the at least one input.

12. The computing device of claim 11, wherein the graphical user interface includes at least one dashboard that presents a unified set of data about a series of disparate topics.

13. The computing device of claim 11, wherein the performance data includes a respective application latency value that corresponds to deployment of the data object in the private cloud platform, the public cloud platform, and the on-premises infrastructure, respectively.

14. The computing device of claim 11, wherein the hardware data includes a provisioned hardware value relating to an amount of hardware that was dynamically provisioned to achieve a respective desired application latency value for the private cloud platform, the public cloud platform, and the on-premises infrastructure, respectively.

15. The computing device of claim 10, wherein the processor is further configured to:

store the at least one metric in a database, wherein the at least one metric includes at least one real-time infrastructure metric and at least one real-time application performance metric, and wherein the on-premises infrastructure includes a locally hosted computing infrastructure.

16. The computing device of claim 10, wherein the processor is further configured to provision the deployment artifact in the retrieved at least one data storage object according to the at least one networked environment prior to the simulation.

17. The computing device of claim 10, wherein the at least one model includes at least one from among a performance model and a pricing model.

18. The computing device of claim 10, wherein the respective predicted implementation information includes at least one from among a respective predicted cost to host the application in the private cloud platform, the public cloud platform, and the on-premises infrastructure, respectively, and a respective predicted performance of the application in the private cloud platform, the public cloud platform, and the on-premises infrastructure, respectively.

19. A non-transitory computer readable storage medium storing instructions for providing predictive cost and performance analytics to facilitate benchmarking of an application host, the storage medium comprising executable code which, when executed by a processor, causes the processor to:

receive, via a graphical user interface, at least one input, the at least one input including a request to benchmark at least one networked environment to host an application, wherein the at least one networked environment includes a private cloud platform, a public cloud platform, and an on-premises infrastructure;

retrieve, from a repository, at least one data storage object that corresponds to the application, the at least one data storage object including at least one from among a deployment artifact and a performance script that is based on the at least one input;

integrate a simulation process with respective network infrastructure for the private cloud platform, the public cloud platform, and the on-premises infrastructure, respectively;

simulate, via a load performance server and the corresponding respective integrated simulation process, respective deployment of the application in the private cloud platform, the public cloud platform, and the on-premises infrastructure, respectively, wherein the load performance server simulates a workload of the application based on the at least one data storage object and the received at least one input;

collect, via a listening server, a respective result of each respective corresponding simulation, each respective result including at least one metric that corresponds to hosting of the application, wherein the listening server monitors respective messages from the private cloud platform, the public cloud platform, and the on-premises infrastructure to compile the respective at least one metric for the private cloud platform, the public cloud platform, and the on-premises infrastructure, respectively; and determine, by using at least one model, respective predicted implementation information that corresponds to at least one from among a predicted cost and a predicted performance associated with hosting the application in the private cloud platform, the public cloud platform, and the on-premises infrastructure, respectively, at a future timepoint, wherein the determining of the respective predicted implementation information is based on the corresponding respective results of the simulation.

20. The storage medium of claim 19, wherein the respective predicted implementation information includes at least one from among a respective predicted cost to host the application in the private cloud platform, the public cloud platform, and the on-premises infrastructure, respectively, and a respective predicted performance of the application in the private cloud platform, the public cloud platform, and the on-premises infrastructure, respectively.

* * * * *